June 6, 1972     W. K. BALDWIN, SR     3,667,833
REAR VIEW MIRROR
Filed Sept. 25, 1970
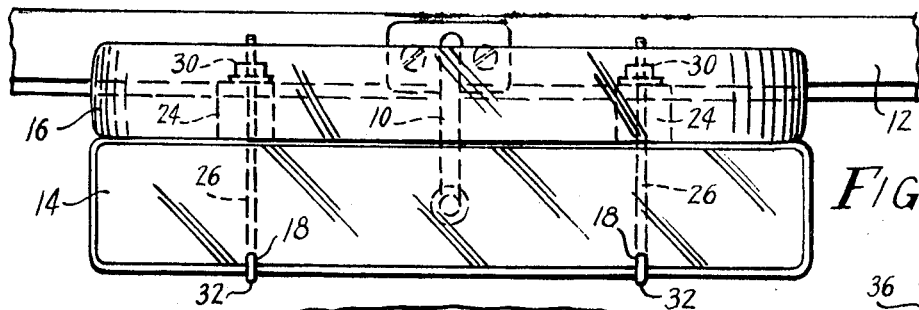
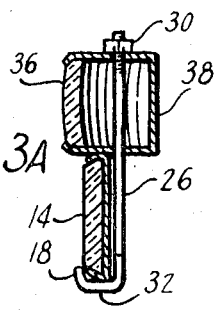
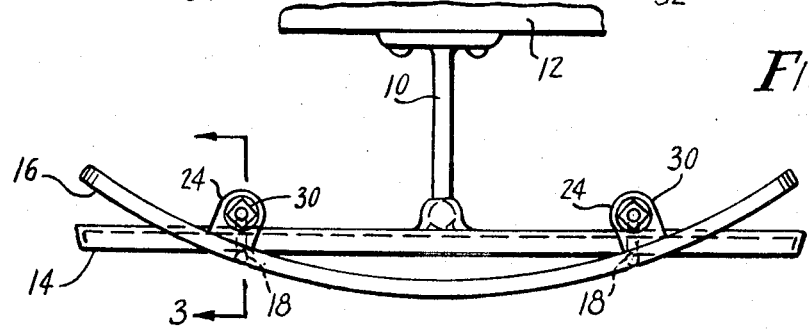
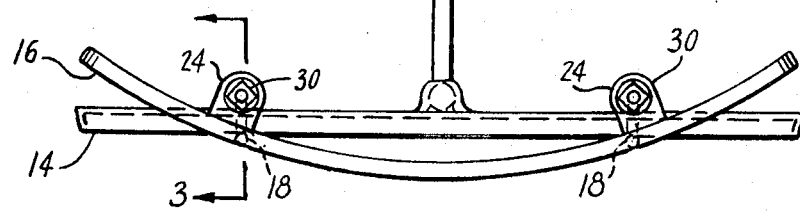
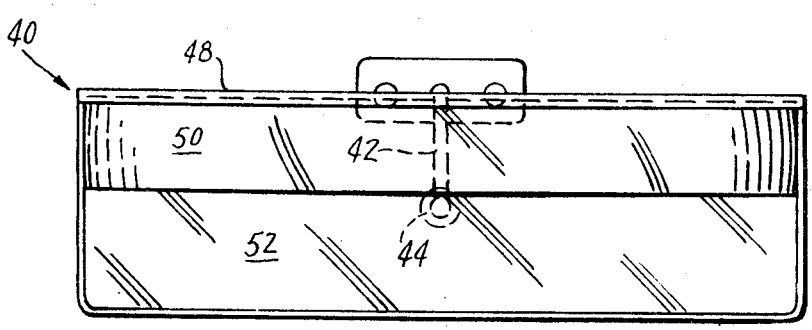
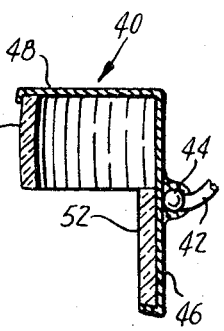
INVENTOR.
WILLIAM K. BALDWIN, SR.
BY
Alexander R. Blair
ATTORNEY.

United States Patent Office 3,667,833
Patented June 6, 1972

3,667,833
REAR VIEW MIRROR
William K. Baldwin, Sr., 5040 Jackson St., Space 22,
North Highlands, Calif. 95660
Filed Sept. 25, 1970, Ser. No. 75,442
Int. Cl. G02b 5/08
U.S. Cl. 350—303
1 Claim

ABSTRACT OF THE DISCLOSURE

A rear view mirror having a plane and a convex portion for viewing on both sides of the vehicle in addition to the rear thereof.

---

This invention relates to a rear view mirror allowing the driver of a vehicle to see the road on both sides of the vehicle as well as directly behind the vehicle without having to turn his head.

Accordingly, a primary object of this invention is to allow the driver to see the road on both sides of the vehicle in addition to behind the vehicle without having to turn his head.

Another object of this invention is to give the driver the option of using the convex or the plane rear view mirror portion.

A further object of this invention is the elimination of the hazardous "blind spot" in a driver's vision.

The above and other objects of this invention will become apparent to those skilled in the art after a consideration of the following detailed description of the preferred embodiments of this invention taken together with the accompanying drawing wherein:

FIG. 1 is a front elevational of the rear view mirror;
FIG. 2 is a plan view thereof;
FIG. 3 is a sectional view taken on line 3—3 of FIG. 2;
FIG. 3A is an embodiment of the mirror shown in FIG. 3;
FIG. 4 is a front elevational view of a one-piece rear view mirror;
FIG. 5 is a plan view thereof; and
FIG. 6 is a sectional view taken on line 6—6 of FIG. 5.

Referring in detail to the drawing, there is shown in FIGS. 1 and 2 an arm 10 pivotally mounted to the interior 12 of the vehicle. Pivotally secured at the rear thereof to the end of arm 10 is a conventional automobile flat rear view mirror 14. A convex mirror 16 having a curvature along its length and height of the same radius, is mounted on top of flat mirror 14 by means of a hook 18 draped over the bottom edge of flat mirror 14. Convex mirror 16 has a U-shaped or solid bracket 24 secured at the rear thereof near each end thereof. Convex mirror 16 is aligned on top of flat mirror 14 so that the elongated portion 26 of hook 18 is inserted through the hole in bracket 24 behind flat mirror 14. A nut 30 secures convex mirror 16 in place when threaded onto the top of elongated portion 26 of hook 18 thereby preventing vibration. The length of horizontal portion 32 of hook 18 allows convex mirror 16 to be adjusted by the driver independent of and relative to the positioning of flat mirror 14 by means of the pivotal connection with arm 10. FIG. 3A shows convex mirror 36 mounted in a casing 38 which is also secured by hook 18.

FIGS. 4-6 show a one-piece rear view mirror 40 secured to an arm 42 by means of a pivotal connection 44. Pivotal connection 44 is secured to the rear of the long leg 46 of an L-shaped housing 48. Mounted within housing 48 and facing the driver is a convex mirror 60 and a flat mirror 52 thereunder. Here, both mirror 50 and 52 are adjusted simultaneously by pivotal connection 44.

While the preferred embodiments of this invention have been herein shown and described, it should be understood that numerous structural modifications and adaptations may be resorted to without departing from the spirit of this invention.

I claim:

1. A rear view mirror, comprising a convex mirror portion, a flat mirror portion immediately below said convex mirror portion, and means connected to said mirror portions securing said mirror portions to each other and allowing adjustment thereof for viewing the road on both sides of the vehicle as well as behind it, said means allowing said convex mirror portion to be adjusted independent of and relative to said flat mirror portion, said means including a hook having a horizontal portion at the bottom thereof and an elongated portion extending thereabove and mounted to the rear of said mirror portions, said horizontal hook portion being secured over the bottom of said flat mirror portion, said hook draping over the front of said flat mirror portion, said flat mirror portion being pivotally connected to the mirror arm extending from and mounted to the interior of the vehicle, and said mirror portions being adjustable simultaneously and in the alternative.

References Cited

UNITED STATES PATENTS

| 3,151,207 | 9/1964 | Moller | 350—303 |
| 1,748,837 | 2/1930 | Greensfelder | 350—302 |
| 2,911,177 | 11/1959 | West | 350—303 |
| 2,758,509 | 8/1956 | Owens | 350—303 |
| 3,048,084 | 8/1962 | Iannuzzi | 350—304 |

DAVID SCHONBERG, Primary Examiner

M. J. TOKAR, Assistant Examiner